United States Patent [19]

Covi

[11] Patent Number: 5,297,997

[45] Date of Patent: Mar. 29, 1994

[54] HAND HELD THREADING DEVICE FOR EARRING POST

[76] Inventor: Timothy J. Covi, 3710 Coachlantern Dr., Wisconsin Rapids, Wis. 54494

[21] Appl. No.: 5,240

[22] Filed: Jan. 15, 1993

[51] Int. Cl.$^5$ ............................................. B23G 5/00
[52] U.S. Cl. .................................... 470/67; 470/185; 470/66
[58] Field of Search .................. 470/67, 66, 70, 81, 470/82, 185, 186, 207; 408/239 R, 215, 184, 233; 279/99, 100, 101, 91

[56] References Cited

U.S. PATENT DOCUMENTS

| | | | |
|---|---|---|---|
| 1,142,923 | 6/1915 | Williams et al. | 470/66 |
| 1,220,149 | 3/1917 | Williams | 470/66 |
| 1,250,323 | 12/1917 | Kohlhaas | 470/66 |
| 1,487,855 | 3/1924 | Hasbrouck | 408/184 |
| 1,545,884 | 7/1925 | Coyne | 470/207 |
| 3,468,068 | 9/1964 | Spruell . | |
| 3,504,507 | 4/1970 | Ferro . | |
| 3,521,313 | 7/1970 | Baker | 470/67 |
| 3,715,168 | 2/1973 | Kuhn | 408/239 R |
| 4,148,199 | 4/1979 | Boykin . | |
| 4,170,118 | 10/1979 | Block . | |
| 4,353,370 | 10/1982 | Evans . | |
| 4,383,002 | 5/1983 | Manolescu . | |
| 4,836,007 | 6/1987 | Saccuccio . | |
| 4,969,780 | 11/1990 | Hermsted | 470/185 |

FOREIGN PATENT DOCUMENTS 2605502 4/1988 France .
2189373 10/1987 United Kingdom .

Primary Examiner—Lowell A. Larson
Assistant Examiner—Michael J. McKeon
Attorney, Agent, or Firm—Julian C. Renfro

[57] ABSTRACT

A hand-held tool is provided for applying threads to an earring post, to enable the earring post to thereafter receive a clutch member in a non-slip relationship. This novel tool comprises an elongate member of generally cylindrical configuration, around one end of which a cap member may be removably secured, such as by the use of interfitting threads. The one end of the elongate member defines a flat recess of circular configuration designed to receive therein, a flat circular die equipped with centrally disposed female threads. The recess is slightly shallower than the thickness of the die, and the die is preferably held in a non-rotative position in the recess by the internally threaded cap being tightened into firm contact with the threaded end of the elongate member. The cap member has a centrally disposed hole therein, into which an earring post may be inserted, and thus be brought into contact with the female threads of the die. As a result of this construction, upon rotation of the elongate member relative to the post, threads will be formed on the post. A die may be operatively mounted on both ends of the elongate member, so that a pair of different size dies may be mounted in a ready-to-use condition.

20 Claims, 2 Drawing Sheets

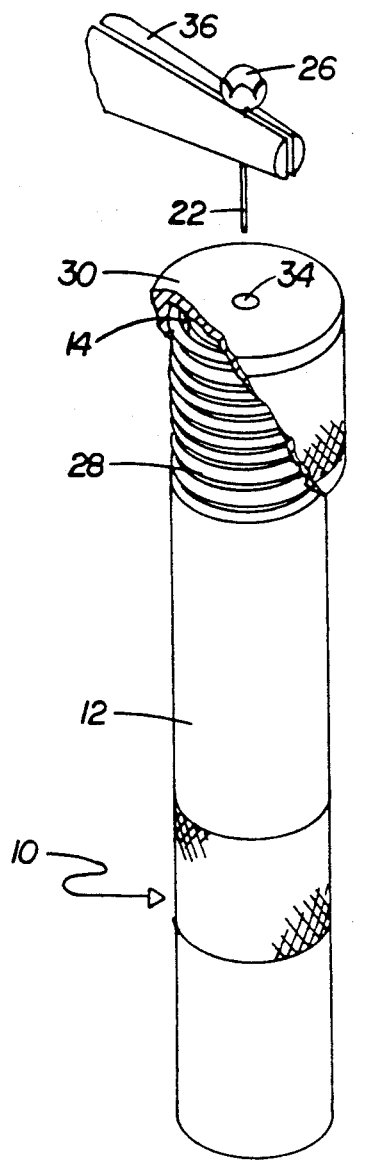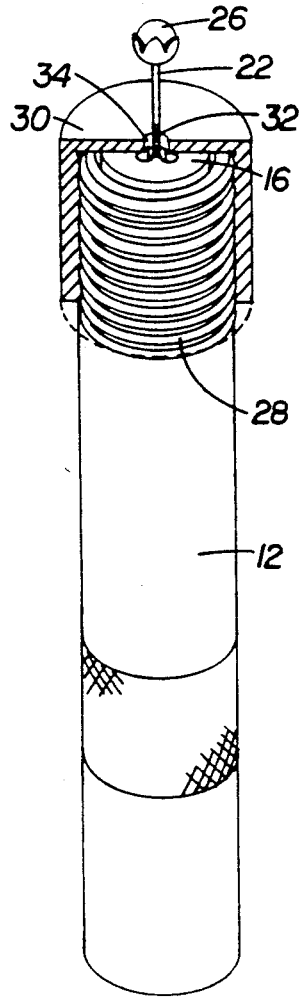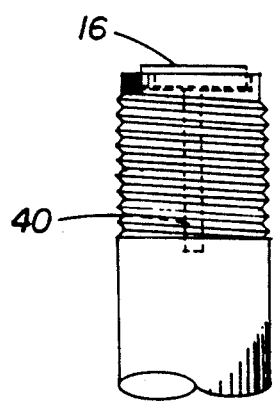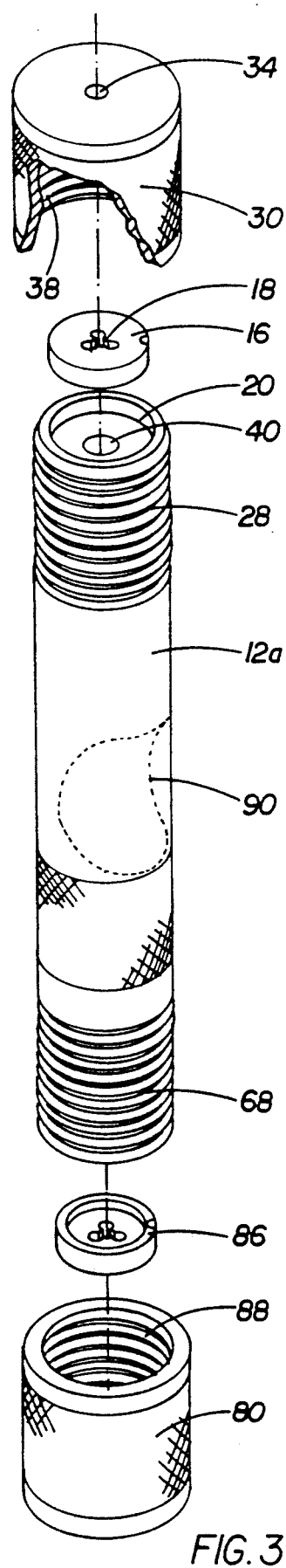
FIG. 1
FIG. 2
FIG. 4
FIG. 3

HAND HELD THREADING DEVICE FOR EARRING POST

BACKGROUND OF THE INVENTION

For many centuries people have pierced their ears so that they can wear earrings involving either "wire" earrings or "post" earrings. In a wire earring, a dangling ornament may be provided with a U-shaped wire at one end of the ornament, with the other end of the U-shaped wire being threaded through the ear and then engaged with a catch provided adjacent the ornament.

In a post earring, the earring is connected to the ear by the end of a slender short rod or post being pushed through the opening in the person's ear, with a friction nut or clutch thereafter being slid onto this other end, to prevent loss of the earring. Unfortunately, the friction nut or clutch sometimes slips off of the relatively smooth sidewalls of an ordinary earring post, which in some instances may lead to the loss of the earring.

In recent years an improvement has been made, designed to prevent the loss of post-type earrings, with this involving the threading of a portion of the post remote from the earring itself. The element used to secure the post on the ear is a clutch, which is a device having a base portion equipped with a central opening about which a plurality of springy fingers are arrayed in a substantially evenly spaced relationship. The free ends of these fingers are being adapted to being brought together in a manner in which these ends tightly engage the threaded exterior of the earring post as the clutch is inserted thereover. In this way the threads on the post are effective to prevent the clutch member from sliding off.

The Block Pat. No. 4,170,118 describes an arrangement of this type in some detail, setting forth that although the clutch can be readily inserted over the threaded portion of an earring post, the clutch cannot be removed without the clutch actually being unscrewed. This is because the tips of the springy fingers that passed over the convolutions of the threading are held in the threading, for these tips of the fingers are biased so as to catch on the flanks of the threads.

It has previously been known that threaded posts can be substituted on an existing earring by having a jeweler or other such craftsman cut off the original post, and then weld on a new, threaded post. Such a procedure as this may well involve temperatures being applied to the earring in the vicinity of 1200° F. to 2000° F., thus requiring the removal of the ornament from some earrings, in order to prevent damage thereto. As is obvious, this will necessarily involve a considerable expense.

It is therefore to be seen that a clear need exists for a person having earrings that are valuable for reasons of sentiment or otherwise, to be easily able to apply threading to unthreaded earring posts, to prevent loss of the earring, and such an invention is described herein.

SUMMARY OF THE INVENTION

A novel hand held tool is provided in accordance with this invention, which enables threads to be readily applied to earring posts. If an earring post has been threaded, it is known that a multi-fingered clutch can then be readily inserted in a non-slip relationship upon such threaded earring post, thus to lessen the possibility of loss of the appended earring. This is of course in contrast with the situation involved when a post is unthreaded, for a backer often falls off of an ordinary unthreaded earring post, leading to the possible loss of the earring.

The novel tool in accordance with this invention comprises an elongate member of generally cylindrical configuration, around one end of which, external threads may be applied. At this one end of the elongate member, a flat recess of circular configuration is defined, with this recess being designed to receive therein, a flat circular die equipped with centrally disposed female threads. The recess in the end of the elongate member is designed to be slightly shallower than the thickness of the die.

A cap member equipped with internal threads is utilized to threadedly engage the earlier-mentioned external threads located on the one end of the elongate member, thus enabling the cap member to be installed on the end of the elongate member, and to retain the die in a fully operative, non-rotative position in the relatively shallow recess. A central hole is provided in the cap member, thus readily making possible the insertion of an earring post that is to be provided with encircling threads.

Because the hole in the cap member coincides with the position of the center recess in the one end of the elongate member, upon the earring post being inserted into the cap, the end of the post is brought into contact with the female threads of the circular die. This enables the cutting of threads on the earring post at such time as the elongate member is rotated with respect to the earring post.

Because the thickness of the die is slightly greater than the depth of the flat recess, the tightening of the cap member effectively holds the die against undesirable rotation.

It is therefore a principal object of this invention to provide an inexpensive yet highly effective tool simplifying the creation of threads around the post of an earring.

It is another object of this invention to provide an elongate member, preferably of generally cylindrical configuration, in one end of which has been provided a shallow, circular recess suitable for receiving a circular die, with a cap means being utilized for retaining the die in the operative position, and for preventing undesired rotation of the die during a procedure in which threads are cut in an earring post.

It is still another object of this invention to provide an elongate member of generally cylindrical configuration that is able to be held in one hand, in one end of which member, a shallow, circular recess has been provided that is suitable for receiving a flat circular die held in place by a cap provided with a central hole into which an earring post can be inserted, so that threads can be applied to the post of the earring at such time as the elongate member is rotated relative to the post.

It is yet another object of this invention to provide an elongate member of generally cylindrical configuration having threads at one end, upon which threads, an internally threaded cap may be tightly applied in order to secure a die in a fully operative, non-slip relationship in the one end of the elongate member.

It is yet still another object of this invention to provide a double ended elongate member having a die-receiving recess at each end, and means for securing a separate die in each such recess, thereby enabling a person without special training to be able to apply threads to either of two different sizes of posts.

These and other objects, features and advantages will be more apparent from a study of the appended drawings, and the accompanying text.

BRIEF DESCRIPTION OF DRAWINGS

FIG. 1 is a perspective view of a first embodiment of my novel threading device for applying threads to an earring post, with this view showing the insertion of an unthreaded earring post into the threading device, in order that threads may be applied to the earring post;

FIG. 2 is a view similar to FIG. 1, revealing the withdrawal of the earring post from the threading device, and showing the newly-created threads;

FIG. 3 is a perspective view of an elongate member in accordance with this invention, revealing in exploded relation, a shallow recess inside one end of the member, a die equipped with internal threads to be inserted in the recess, and the internally-threaded cap designed for insertion upon the elongate member in order to retain a die in an operative, non-slip relationship therein, with this view also revealing that a die may be mounted at both ends of the member;

FIG. 4 is a fragmentary view of the threaded end of my novel device, here revealing the use of a blind hole to permit the entry of a substantial length of earring post into the elongate member during the threading procedure;

DETAILED DESCRIPTION

Figure 5:
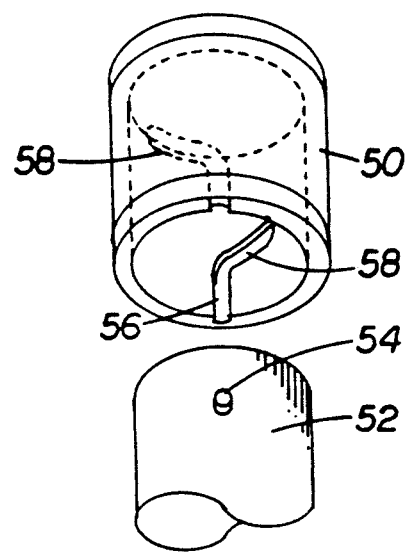
FIGS. 5 and 6 are views of alternative cap securing arrangements, using mechanical means other than threads.

With initial reference to FIG. 1, it will there be seen that I have depicted my novel hand held tool 10 for applying threads to an elongate post associated with an item of jewelry, such as the post of an earring. The purpose served is to enable the post to thereafter receive a clutch member in a non-slip, threaded relationship.

The hand held tool 10 is seen in FIG. 1 to comprise an elongate member 12 having at least one end in which a die-receiving means 14 is defined. In the preferred construction, the die-receiving means is a comparatively shallow recess serving to receive and non-rotatively support a flat die equipped with centrally disposed female threads. Such a die 16 is to some extent shown in FIG. 2, but to a greater extent in FIG. 3, wherein the die 16 is revealed to be of circular configuration, being shown in an exploded relationship to the die-receiving recess 20.

It will be noted from FIG. 3 that the die 16 is equipped with centrally-disposed female threads 18, and because of their positioning in the central portion of the die 16, these female threads 18 are intended to receive an elongate post 22 for the threading thereof, during rotation of the elongate member 12a relative to the post 22. The elongate post is of course to be seen in FIGS. 1 and 2.

It will be noted in FIGS. 1 through 3 that the elongate member 12 (and 12a) is provided with encircling threads 28 at what may be regarded at this particular time as the upper end of the elongate member, for it is desired that the elongate member be utilized in conjunction with means for retaining the flat die 16 in an operative relationship. To that end, I prefer to utilize a cap 30 having internal threads 38 (note FIG. 3) that match the threads 28 encircling this end of the elongate member.

It will be noted from FIGS. 1 through 3 that a hole 34 is provided in a central location of the cap 30, this hole being of a size to permit an unthreaded earring post 22 or the like to be readily inserted. Because the die 16 containing the female threads 18 is intended to be operatively mounted on the centerline of the end of the member 12 (and 12a), the female threads 18 of the circular die 16 can be expected to receive the elongate post 22 when the post is inserted into the centrally-disposed hole 34 of the cap 30. Upon the female threads 18 receiving the post 22, threads 32 can be cut for a substantial length along the outer surface of the post 22 at the time of relative rotation of the member 12 with respect to the post 22; note FIG. 2.

Returning to FIG. 1, it is to be understood that in many instances, an elongate post 22 may be part of an earring 24 having an ornament portion 26. In such an instance, it would be a temptation to hold the earring 24 by the ornament, but inasmuch as this might result in breakage, it is my recommendation that the user of my hand held tool utilize the tips 36 of pliers for firmly holding the elongate post 22 in the manner shown in FIG. 1. It is not consequential whether the post 22 be rotated with respect to the elongate member 12, or the member 12 be rotated with respect to the post, so I regard the creation of threads 32 along the outer surface of the post 22 resulting from relative rotation of the member 12 with respect to the post 22.

As is known, if an earring post has been threaded, a multi-fingered clutch can then be readily inserted in a non-slip relationship upon such threaded earring post, thus to lessen the possibility of loss of the appended earring. This is particularly true because the clutch must be unscrewed from the earring if it is to be removed.

Returning to FIG. 3, it will be seen from this exploded FIGURE that I have revealed the a shallow recess 20 to be generally circular, to permit the insertion therein of the flat circular die 16 whose middle portion is equipped with female threads 18. Although the die and the recess are normally circular, I am not to be limited to this, for other die configurations and recess configurations within the spirit of this invention could be utilized.

It will be noted from FIG. 3 that I utilize a blind hole 40 on the longitudinal centerline of the member 12a, which is substantially deeper than the recess 20; in this regard note FIG. 4 in particular. The hole 40 in this member and in member 12 makes it possible for the end of the earring post to move on through the die 16 and relatively deeply into the elongate member during the application of threads along a substantial length of the earring post 22.

The recess 20 in the end of the elongate member 12 is designed to be slightly shallower than the thickness of the flat circular die 16, with this fact being able to be seen from an inspection of FIG. 4. Because the die 16 extends slightly above the recess, as is clear from FIG. 4, it is readily possible for a slippage-preventing procedure in the form of pressure applied to the top of the die 16 to be utilized, thus preventing the die 16 from rotating with respect to the elongate member 12 during the application of threads to the earring post 22.

As previously mentioned, my novel elongate member 12, which preferably is of generally cylindrical configuration, is utilized in conjunction with a cap member 30 equipped with internal threads 38 matching the above-mentioned external threads 28 disposed around the one end of the elongate member 12. The internal threads 38 of the cap member 30 enable it to be threadedly installed in a tightly fitting manner upon the one end of the elongate member 12. In this way the die 16 is retained in an operative, non-slip relationship in the one end of the elongate member, for the application of pressure to the die 16 by the underside of the cap 30 at the time the cap is tightened serves to hold the die in a highly desirable operative condition.

I am not to be limited to the use of threads for holding the cap on the one end of the elongate member containing the recess 20, for other interfitting relationships could be used if desirable. For example, in FIG. 5 I reveal a cap 50 that is held in position on the end of member 52 by friction means. In accordance with this construction, I use a pair of protrusions 54 that are located on opposite sides of the member 52, with the interior of the cap 50 having vertically-disposed slots 56 positioned to receive such protrusions when the cap 50 is placed on the end of member 52.

It is to be noted that the upper end of each of the vertically-disposed slots 56 is connected to a respective angularly disposed slot 58. This arrangement is such as to permit entry of the protrusions 54 into the angled slot portions 58 at such time as the cap 50 is twisted into a tightly fitting manner upon the end of the member 52.

Figure 6:
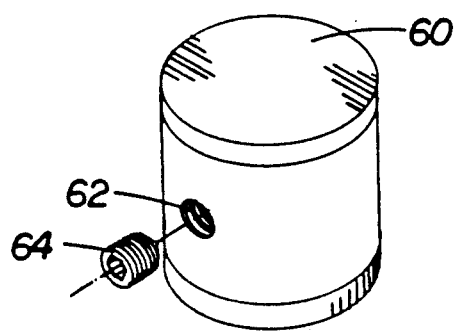

FIG. 6 shows another alternative in which a cap 60 is equipped with a tapped hole 62. A set screw 64 is threadedly inserted into the tapped hole 62 and then tightened by an Allen wrench (or screwdriver) of suitable size as soon as the cap 60 has been pressed down upon the elongate member. Both cap 50 and cap 60 are provided with central holes permitting the insertion of an earring post or the like.

It is important to note that the elongate member I utilize for supporting a die may be double ended, with this construction being revealed in FIG. 3. In this FIGURE, the end of the elongate member 12a opposite the shallow recess 20 is provided with a like recess 70, as indicated by phantom lines in this FIGURE. Encircling the end of member 12a opposite the threads 28 are threads 68, which can be similar to or identical with the threads 28.

An internally-threaded cap 80, which is similar to or identical with the cap 30, is provided with internal threads 88, to enable the cap 80 to be tightly applied to the threads 68. The recess 70 is designed to receive the die 86, and by the use of the cap 80, the die 86 can be held in the recess 70 in a non-rotative manner.

As was the case involving the cap 30, the cap 80 is provided with a central hole (not shown), into which a post to be threaded can be received, and brought into contact with the female threads of the centrally located die 86. In a manner quite similar to that previously discussed, a blind hole comparable to the blind hole 40 of FIG. 4 is utilized in the end of the member 12a containing the threads 68, to permit the post to enter as deeply as necessary along the centerline of the member 12a.

As should now be clear, by providing each cap member with a central hole, and locating the female threads of the die on the centerline of the elongate member, it can be anticipated that the end of the inserted earring post will make contact with the centrally-located female threads of the die. Upon this contact of the post with the female threads, the elongate member 12 (or 12a) can be rotated relative to the post so as to bring about the cutting of threads along a substantial length of the post.

As previously mentioned, because the thickness of the die 16 (or 86) is slightly greater than the depth of the flat recess in which it is received, the tightening of the cap member advantageously holds the die against undesirable rotation with respect to the elongate member.

In FIG. 2 I reveal the withdrawal of the earring post 22 from the threads 18 of the female die 16, thus revealing that threads 32 have been created along a substantial part of the length of the earring post.

Figure 7:
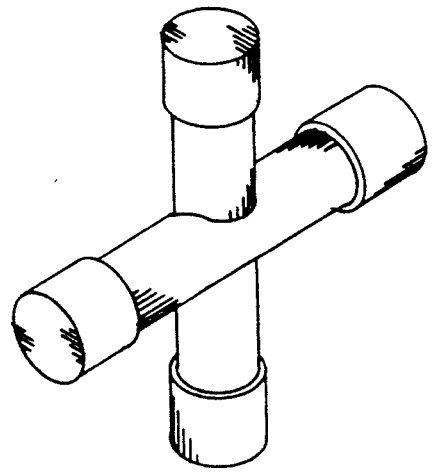
FIG. 7 is a perspective view showing how a pair of the double ended devices of FIG. 3 can be joined together at their mid portions to make four dies readily available.

Because it may be desirable to maintain each of several die sizes in its operative position, I may utilize a pair of members 12a secured together in what may be regarded as a plus (+) configuration. With regard to FIG. 3, a mid portion 90 could be removed from each of two substantially identical members 12a, such that the user can join such pair of members together at right angles in the manner shown in FIG. 7, being held together by the use of a screw, a nut and bolt, or more permanent means. In this way the user can place a different size die in each end of each member, and thus have four dies mounted in an operative relationship.

As should now be apparent, I have provided herein a tool easily held in one hand and readily usable for the application of threads to the post of an earring or like device. This tool is made available at a relatively low expense, with no special training being required in order that threads may be readily applied to earring posts of gold, silver, surgical steel and even stainless steel. As is obvious, stainless steel is a very hard and tough metal, thus requiring a more frequent replacement of the die than when threads are being applied only to posts of gold or silver.

It should also be apparent that dies arranged to deal with earring posts of various diameters can be utilized in accordance with my invention, with there being at least seven sizes of such dies. More specifically, the dies used with my invention can be employed to cut threads upon posts of 0.70 mm, 0.75 mv, 0.80 mm, 0.85 mu, 0.90 mm, 0.95 mm and 1.00 mm. As is obvious, when the double ended elongate member of FIG. 3 is utilized, the user may find it convenient to mount one size die in one end of the device, and a different size die in the other end. As is further obvious, should the user join two double ended members together in the right-angle relationship depicted in FIG. 7, he can, as mentioned hereinabove, then can have four die sizes readily available for immediate use. To change a die, it is a simple matter to loosen and remove the cap, remove the one die, insert a replacement die, and then reapply the cap in a proper manner.

While I have described the elongate member 12 and 12a as preferably being generally circular in cross section, I am obviously not to be limited to this, for should such be warranted, other configurations of the elongate member could be used. If the flat die-receiving recess is other than circular, and the outer portion of the die body is of a like configuration, any likelihood of the die undertaking undesirable rotation with respect to the elongate member is made quite small.

I am not limited to utilizing any particular material in the construction of my novel tool, but devices made of either aluminum or industrial grade plastic have proven satisfactory. I am likewise not limited to dies made by any one manufacturer, but I have found that dies manufactured by Bergeon of Leloc, Switzerland may be used very satisfactorily in my novel device.

I claim:

1. A hand held tool for applying threads to an elongate post associated with an item of jewelry, such that the post can thereafter receive a clutch member in a non-slip, threaded relationship, said tool comprising an elongate member having at least one end, in which end, die-receiving means are defined, said die-receiving means comprising a recess and serving to non-rotatively support a die equipped with centrally disposed female threads into which an elongate post can be inserted, centrally-disposed guide means supported by said tool and providing an aperture only slightly larger than the elongate post to be inserted, such aperture in said guide means being disposed on the same centerline as the female threads of the die and serving to provide precise alignment for the elongate post with the threads at such time as the post is inserted into the die, whereby during relative rotation, threads can be formed upon the elongate post inserted into the female threads of the die the end of said elongate member being circular, and said centrally-disposed guide means is a cap that is sized to fit on the circular end of said elongate member, said cap serving to secure the die in a non-rotative position in said recess, and to retain the shavings created as threads are formed on the elongate post.

2. The hand held tool for applying threads to an elongate post as recited in claim 1 in which said recess is flat, and the die to be received in said recess is also flat.

3. The hand held tool for applying threads to an elongate post as recited in claim 2 in which said recess is slightly shallower than the thickness of the die to be inserted therein, and cap means are operatively associated with said elongate member, the die being held in said recess by said cap.

4. The hand held tool for applying threads to an elongate post as recited in claim 1 in which said cap is threadedly received on said elongate member.

5. The hand held tool for applying threads to an elongate post as recited in claim 1 in which said cap is held on said elongate member by friction means.

6. The hand held tool for applying threads to an elongate post as recited in claim 1 in which said elongate member has two ends and a recess is provided in both such ends, such that a flat die can be inserted into either recess, a separate cap being used at each end of said elongate member, to hold the respective die in operative position, with each cap being equipped with a centrally disposed hole to serve as said centrally disposed guide means, such that an elongate post can be inserted into either end of said member and then threaded during relative rotation, each cap also serving to retain the cuttings created as threads are formed upon an inserted elongate post.

7. The hand held tool for applying threads to an elongate post as recited in claim 6 in which a pair of said two-ended elongate members are utilized in combination, with a first of said members being affixed in approximately a right-angle relationship to a second of such members, such that up to four flat dies can be mounted in said tool.

8. A hand held tool for applying threads to an elongate post associated with an item of jewelry, such that it can thereafter receive a clutch member in a non-slip, threaded relationship, said tool comprising an elongate member having at least one end, in which end a flat recess for receiving a flat die is defined, such flat die being equipped with centrally disposed female threads into which an elongate post can be received, and means serving to retain the die in an operative position in said recess, latter means also serving a guide function for the inserted elongate post, to assure alignment of the elongate post with the centrally disposed female threads of the flat die, said means also serving to catch and retain the cuttings created during relative rotation, when threads are formed upon the elongate post inserted into the female threads of the die the end of said elongate member being circular, and said means comprises a cap operatively received on said at least one end, said cap serving to secure the die in a non-rotative position in said recess as well as to provide the guide function.

9. The hand held tool for applying threads to an elongate post as recited in claim 8 in which means are utilized for holding the die in a non-rotative position in said recess.

10. The hand held tool for applying threads to an elongate post as recited in claim 8 in which both said recess and said die are circular.

11. The hand held tool for applying threads to an elongate post as recited in claim 8 in which said recess is slightly shallower than the thickness of the die to be inserted therein.

12. The hand held tool for applying threads to an elongate post as recited in claim 8 in which said elongate member has two ends and a recess is provided at both such ends, such that a die can be inserted into either recess, a separate cap being used at each end of said elongate member, with each cap being equipped with a centrally disposed hole that serves to provide the guide function, such that an elongate post can be inserted into either end of said member and then threaded during relative rotation.

13. The hand held tool for applying threads to an elongate post as recited in claim 12 in which a pair of said two-ended elongate members are utilized in combination, with a first of said members being affixed in approximately a right-angle relationship to a second of such members, such that a total of four flat dies can be mounted in said tool.

14. A hand held tool for applying threads to an elongate post associated with an item of jewelry, such that it can thereafter receive a clutch member in a non-slip, threaded relationship, said tool comprising an elongate member of generally cylindrical configuration, around one end of which a cap member may be removably secured, said one end of said member defining a flat recess of circular configuration designed to receive therein, a flat circular die equipped with centrally disposed female threads, said cap serving to retain the die in a non-rotative position in said recess, said cap member having a centrally disposed hole of relatively small size, said hole being only slightly larger than the elongate post to be inserted therein, and thus be brought into contact with the female threads of the die, whereby upon said member being rotated relative to the elongate post, threads will be formed on the elongate post while the post is held in a centered position by said cap member.

15. The hand held tool for applying threads to an elongate post as recited in claim 14 in which said recess is slightly shallower than the thickness of the die, and the die is held in a non-rotative position in said recess by said cap being tightened on said end of said member.

16. The hand held tool for applying threads to an elongate post as recited in claim 14 in which a recess is provided at both ends of said elongate member of generally cylindrical configuration, such that a die can be installed in each recess, a separate cap being used at each end of said member, with each cap being equipped with a centrally disposed hole, such that an elongate post can be inserted into either end of said member and threaded at the time of relative rotation.

17. A hand held tool for applying threads to an earring post, to enable the earring post to thereafter receive a clutch member in a non-slip relationship, said tool comprising an elongate member of generally cylindrical configuration, around one end of which, external threads have been applied, said one end of said elongate member defining a flat recess of circular configuration, said recess being designed to receive therein a flat circular die equipped with centrally disposed female threads, said recess being slightly shallower than the thickness of the die, a cap member equipped with internal threads matching the threads located on said one end of said elongate member, thus enabling said cap member to be threadedly installed on said one end of said elongate member, and to retain the die in an operative position, said cap member having a centrally disposed hole of relatively small size, said hole being only slightly larger than the earring post to be inserted therein, and thus be brought into contact with the female threads of the die, whereby upon rotation of said elongate member, threads will be formed on the earring post, said cap member also serving to catch and retain the cuttings created during the threading of the earring post.

18. The hand held tool for applying threads to an earring post as recited in claim 17 in which the die is held in a non-rotative position in said recess by the cap being tightened on said threaded end of said elongate member.

19. The hand held tool for applying threads to an elongate post as recited in claim 17 in which a recess is provided at both ends of said elongate member of generally cylindrical configuration, such that a die can be inserted in each recess, a separate cap being used at each end of said member, with each cap being equipped with a centrally disposed hole, such that an elongate post can be inserted into either end of said member and threaded at the time of relative rotation.

20. The hand held tool for applying threads to an elongate post as recited in claim 19 in which a pair of said two-ended elongate members are utilized in combination, with a first of said members being affixed in approximately a right-angle relationship to a second of such members, such that a total of four flat dies can be mounted in said tool.

* * * * *